Sept. 26, 1950  
E. McCLOY  
2,523,994  
MANURE SPREADER  
Filed Aug. 16, 1946  
2 Sheets-Sheet 1
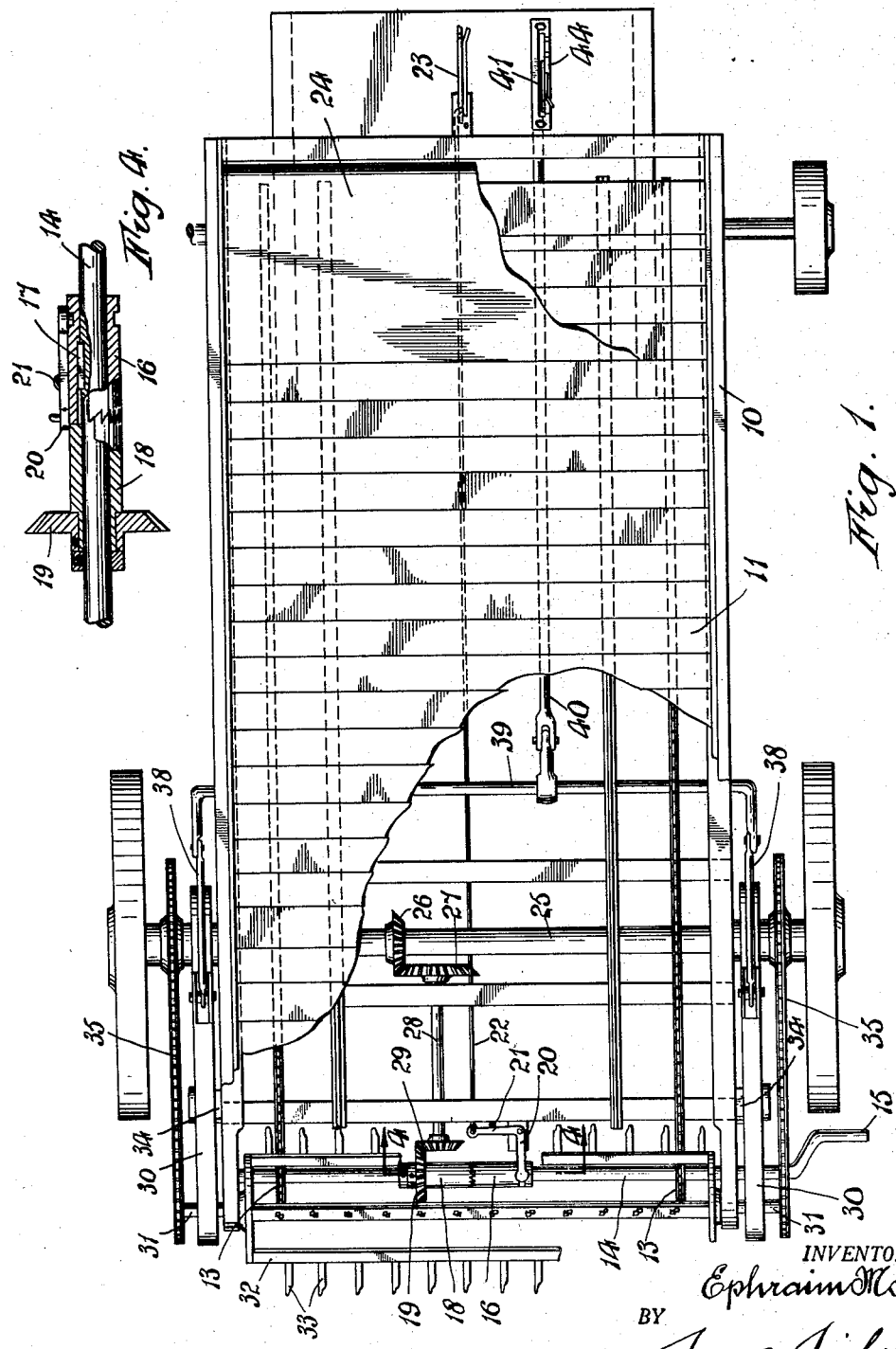
INVENTOR.  
Ephraim McCloy  
BY  
Stanley Lightfoot  
ATTORNEY Sept. 26, 1950   E. McCLOY   2,523,994
MANURE SPREADER
Filed Aug. 16, 1946   2 Sheets-Sheet 2
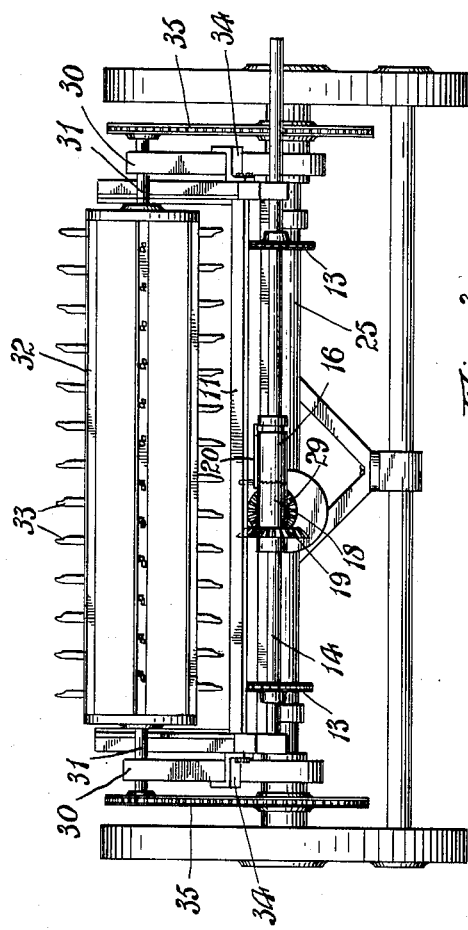
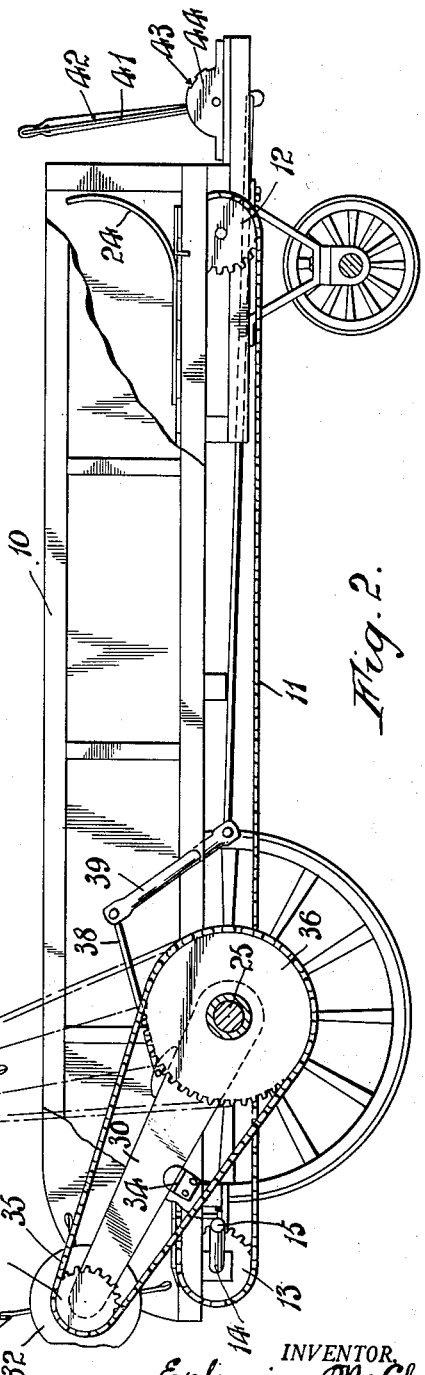
INVENTOR
Ephraim McCloy
BY
Stanley Lightfoot
ATTORNEY Patented Sept. 26, 1950

2,523,994

UNITED STATES PATENT OFFICE 2,523,994

MANURE SPREADER

Ephraim McCloy, Detroit, Mich.

Application August 16, 1946, Serial No. 691,055

1 Claim. (Cl. 275—5)

This invention has reference to load distributing wagons, such as manure spreaders, wherein a rotary beater is employed at the rear end of the wagon for the purpose of impelling the load from the wagon and effecting its distribution over the ground as the wagon is moved forwardly. The invention has for its object to provide such a device which is mechanically simple in construction and operation and in which the beater is operated in a manner ensuring effective handling and distribution of material from the wagon notwithstanding variations in the density or quantity of the material being fed thereto, or the presence of stones or foreign matter therein which might otherwise damage or interfere with the operation of the beater.

A further object is to provide a simple mechanism for controlling the operation of the beater and the operation of the means feeding material to the beater during the progress of the wagon over the ground.

A further object of the invention is to provide simple mechanism for facilitating the loading or unloading of the wagon.

A still further object is to provide means whereby the beater may be readily moved out of operative position to permit unobstructed loading or unloading of the wagon from the rear; and a still further object is to provide means whereby the beater may rest yieldingly and gravitationally on the load as it is fed thereto.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a plan of a wagon equipped for the spreading of manure as in the fertilizing of farm land with parts of the apron structure broken away to disclose the operating mechanism;

Figure 2 is an elevation of the same with parts of the side walls of the wagon similarly broken away;

Figure 3 is a rear elevation of the wagon;

Figure 4 is a detail section of the mechanism taken on a plane indicated by the line 4—4 in Figure 1; and Figure 5 is a perspective view of a preferred form of tine as used on the rotary beater.

Similar characters of reference indicate similar parts in the several figures of the drawings.

A wagon, generally numbered 10, has a floor or apron 11 in the form of an endless belt of slats capable of traveling on sprockets 12 and 13 at the front and rear of the wagon respectively, the rear sprockets 13 being mounted on a transverse shaft 14 which is provided with a hand crank 15.

Carried by and rotatable with the said shaft 14 is a slidable sleeve 16 which is keyed at 17 to the said shaft for rotation therewith, this sleeve having endwise ratchet engagement with a second sleeve 18 which is otherwise freely rotatable on the shaft and carries a bevel gear 19. Obviously, if the ratchet ends of the two sleeves 16 and 18 are engaged, the gear 19 may drive the said shaft 14 through the medium of the sleeve 16. Movement of the sleeve, as by means of a bell-crank lever 20, may be effected against the resistance of a spring 21 to disengage the said sleeves from one another and thus free the shaft 14 from operation by the gear 19 when so desired.

Thus, when the sleeves are so disengaged by the operation of the said bell crank 20 (as through the medium of the rod 22 and operating lever 23) the shaft 14 may be rotated in one or other direction by means of the crank 15 without interference with or resistance by any mechanism with which the aforesaid gear 19 is connected; and, in this manner the floor or apron 11 may be manually moved forwardly or rearwardly of the wagon to facilitate loading or unloading thereof.

For instance, the floor may be moved rearwardly until the end wall member 24 carried thereby is brought into the proximity of the open rear end of the wagon; and, as the load is piled thereon, the floor may be moved forwardly to receive additional load until the entire wagon has been so filled.

This permits easy loading of the wagon as all material is simply piled in the rear portion of the wagon and then moved forwardly in the manner described. Similarly, if it is desired to dump the load, or part thereof, this may be effected by simply rotating the shaft 14 manually in an opposite direction.

The rear axle 25 of the wagon is shown as being provided with a bevel gear 26 adapted to drive the gear 19 through the agency of gear 27, shaft 28, and gear 29, as clearly seen in Figure 1.

Also mounted and freely swingable on the said axle are arms 30 in the ends of which is journalled the shaft 31 of a rotary beater 32 provided with tines 33. The said arms in their position of rest impinge on stops 34 which result in the said beater 32 being so positioned above the rear end of the apron of the wagon that rotation of the beater will serve to dislodge and distribute material from that portion of the apron. Such rotation of the beater is effected by the chains 35 passing over the sprocket wheels 36 and 37 on the axle 25 and the beater shaft 31 respectively.

It will be observed that, with the wagon moving forwardly, the beater will rotate in a clockwise direction, as viewed in Figure 2, which is opposite to the direction of rotation usually employed in wagons of this general type having beaters stationed at the rear end thereof.

It will also be noted from an examination of Figure 2 that the beater may be raised to such an extent above the apron as to permit the wagon to be used for ordinary haulage without interference by the beater, and to effect such movement I have provided the beater arms 30 with linkage 38, 39, and 40 controlled by an operating lever 41 in the manner which will be clear without further explanation. The said lever 41 may be provided with a locking member 42 adapted to engage the notch 43 of a quadrant 44 to maintain the beater in such raised position when desired.

When the wagon has been loaded with manure or material as in the manner described, and it is desired to spread this material on the ground as the wagon is moved forwardly thereover, the lever 41 is released so that the beater will rest gravitationally either on the stops 34 or somewhat raised therefrom by the material immediately beneath the beater; and, as the material is removed from the wagon by the clockwise rotation of the beater, the arms will rise and fall to some extent during the process as a result of differing densities of materials passing therebeneath. Thus the beater automatically adapts itself to such constantly changing conditions while continuously performing its spreading or distributing function, and occasional masses of material, stones, or other foreign matter which may damage the beater or otherwise interfere with its operation are permitted to pass thereunder whereby a highly desirable action of the beater on the material during a spreading or distributing operation is also secured.

I prefer to make the tines 33 of the beater on the order of that shown in Figure 5 wherein the outer end of the tine is twisted, as at 45, to exert a side thrust on the material as it is engaged by the tine in the beating operation, this side thrust assisting in the operation and breaking up of the material as well as the spreading thereof as it is distributed from the beater; and I prefer that the tines situated between the center and one end of the beater be twisted in one direction to urge the material toward that end of the beater, while the other tines from the center to the opposite end of the beater are twisted in an opposite direction to similarly urge the material in the direction of such other end of the beater.

To stop or arrest the progress of the feeding of material under the beater at any time, the lever 23 may be operated to cause the rod 22 to move rearwardly of the wagon so that the bell-crank lever 20 may move the sleeve 16 out of engagement with the sleeve 18 and thus render the drive through the gear 19 to the shaft 14 neutral.

The arrangement described permits of easy loading and unloading of the wagon without interference by the beater or its mechanism; and, when the beater is in operation, not only ensures an effectively controlled feeding of material to the beater but permits the beater to automatically adjust itself to secure more effective breaking up, dislodging, and distribution of material from the wagon irrespective of the speed at which the wagon may be drawn over the ground. The direction of rotation of the beater is such that the material is passed beneath the beater, instead of being picked up and thrown thereover as is usual in manure spreaders and similar devices as heretofore constructed, and further ensures proper handling of the material without waste or improper distribution.

This invention may be developed within the scope of the following claim without departing from the essential features of the said invention, and it is desired that the specification and drawings be read as being merely illustrative of a practical embodiment of the same and not in a strictly limiting sense.

What I claim is:

In a wheeled wagon of the type described, a conveyer apron comprising the floor of the wagon, transmission means coupling said apron to wheels of said wagon for moving said apron in a rearward loading-discharging direction by the forward movement of said wagon, a rotary beater above the rear end of said apron, supporting arms for said beater swingable about the axis of the rear wheels of said wagon, said arms being of a length whereby said beater may be raised to an inoperative position above said apron to an extent permitting unobstructed rear loading of said wagon, beater-rotating means coupling said beater to said axle, manually operable means for raising and lowering said arms, and locking means for securing said arms in their raised position.

EPHRAIM McCLOY.

REFERENCES CITED

The following references are of record in the file of this patent:

UNITED STATES PATENTS

| Number | Name | Date |
|---|---|---|
| 825,655 | Jessen | July 10, 1906 |
| 851,928 | Goodhue | Apr. 30, 1907 |
| 873,030 | Dennis et al. | Dec. 10, 1907 |
| 899,580 | Warner | Sept. 29, 1908 |
| 973,742 | Arnold | Oct. 25, 1910 |
| 1,177,391 | Davis | Mar. 28, 1916 |
| 1,218,866 | Jirdinston | Mar. 13, 1917 |
| 1,225,873 | Sharp | May 15, 1917 |
| 2,094,572 | Hendricks et al. | Sept. 28, 1937 |